United States Patent
Hu et al.

(10) Patent No.: US 9,077,389 B2
(45) Date of Patent: Jul. 7, 2015

(54) METHOD AND SYSTEM FOR PROCESSING RADIO PACKAGES IN A MULTIMODE SOFTWARE DEFINED RADIO (SDR) TERMINAL

(75) Inventors: Liangliang Hu, Shanghai (CN); Yanmeng Sun, Shanghai (CN)

(73) Assignee: NXP, B.V., Eindhoven (NL)

( * ) Notice: Subject to any disclaimer, the term of this patent is extended or adjusted under 35 U.S.C. 154(b) by 894 days.

(21) Appl. No.: 12/812,577

(22) PCT Filed: Jan. 15, 2009

(86) PCT No.: PCT/IB2009/050137
§ 371 (c)(1),
(2), (4) Date: Jan. 12, 2011

(87) PCT Pub. No.: WO2009/090607
PCT Pub. Date: Jul. 23, 2009

(65) Prior Publication Data
US 2011/0117871 A1    May 19, 2011

Related U.S. Application Data

(60) Provisional application No. 61/021,113, filed on Jan. 15, 2008.

(51) Int. Cl.
*H04M 1/00* (2006.01)
*H04B 1/00* (2006.01)
*G06F 9/48* (2006.01)
*G06F 9/50* (2006.01)

(52) U.S. Cl.
CPC ............ *H04B 1/0003* (2013.01); *G06F 9/4881* (2013.01); *G06F 9/5038* (2013.01); *G06F 2209/484* (2013.01)

(58) Field of Classification Search
USPC ............... 455/418–420, 552.1, 436; 709/230, 709/217; 370/342, 328, 230, 347; 712/228–229, 35–37, 39–43, 13, 712/20–22, 219, 207–214; 717/168–178, 717/120–149; 718/102–104, 106–108
See application file for complete search history.

(56) References Cited

U.S. PATENT DOCUMENTS

| 6,415,384 B1 | 7/2002 | Dave |
| 7,151,925 B2 | 12/2006 | Ting et al. |
| 7,784,028 B2 * | 8/2010 | Luo et al. ..................... 717/120 |
| 2002/0120664 A1 | 8/2002 | Horn et al. |

(Continued)

FOREIGN PATENT DOCUMENTS

| EP | 1 503 603 A2 | 2/2005 |
| WO | 9829808 A1 | 7/1998 |
| WO | 2006/126943 A1 | 11/2006 |

*Primary Examiner* — Marcos Torres

(57) ABSTRACT

A technique for processing radio packages is disclosed. In an embodiment, the processing of a radio package is divided into subtasks and results of the radio package processing are stored on a per-subtask basis. Because the processing of a radio package is divided into subtasks and because results of the processing are stored on a per-subtask basis, context switches can be made at the subtask level instead of at the task level. With the ability to perform context switches at the subtask level, the processing of radio packages can be scheduled in a more efficient manner and context switches can be made without losing processing results that have already been generated. In addition to storing the processing results on a per-subtask basis, in an embodiment, a processing pipeline is drained on a per-subtask basis.

6 Claims, 5 Drawing Sheets

(56) References Cited

U.S. PATENT DOCUMENTS

| | | |
|---|---|---|
| 2003/0050055 A1 | 3/2003 | Ting et al. |
| 2004/0190553 A1 | 9/2004 | Ward et al. |
| 2004/0242261 A1 | 12/2004 | Fette |
| 2005/0125793 A1 | 6/2005 | Aguilar, Jr. et al. |
| 2006/0211387 A1 | 9/2006 | Pisek et al. |
| 2006/0271765 A1* | 11/2006 | Tell et al. ......... 712/35 |

* cited by examiner

METHOD AND SYSTEM FOR PROCESSING RADIO PACKAGES IN A MULTIMODE SOFTWARE DEFINED RADIO (SDR) TERMINAL

The invention relates generally to wireless communications systems, and more particularly, to processing radio packages in a multimode Software Defined Radio (SDR) terminal.

SDR has been recognized as one of the most important new technologies for wireless communications in recent years. The SDR Forum (www.sdrforum.org) defines SDR technology as "radios that provide software control of a variety of modulation techniques, wide-band or narrow-band operation, communications security functions (such as hopping), and waveform requirements of current and evolving standards over a broad frequency range."

SDR technology implements signal processing functionality as software modules running on a generic processor. Furthermore, multiple software modules implementing multiple different radio protocols can be present in a single SDR terminal. Because different radio protocols require different kinds of signal processing, an SDR terminal needs to be able to schedule processing tasks related to the different radio protocols in a manner that meets the real-time requirements of each radio protocol.

Conventional task scheduling techniques include, for example, first-in first-out (FIFO), round-robin, and rate monotonic scheduling. These scheduling techniques are generic scheduling techniques that are able to handle different tasks implemented by an operating system. Implementing a flexible scheduling technique requires status monitoring and context switching, both of which take some time to perform. The status monitoring and context switching associated with typical scheduling techniques can negatively effect the time-critical processing in an SDR terminal.

In most radio protocols, the basic processing unit of a radio communication is a discrete radio package, for example, a symbol, a frame, or a time slot. With respect to an SDR terminal, baseband processing typically consists of a repetitive series of protocol-specific tasks that are performed on each radio package, for example, the number, sequence, and run time of tasks are repeated for each radio package.

The processing of a radio package usually consists of a known set of tasks and the known set of tasks is the same for each radio package. Although the set of tasks is the same for each radio package of the same radio protocol, radio packages of a different radio protocol will likely require a different set of tasks. Another characteristic of signal processing in SDR terminals is the dependency of tasks. For example, demodulating a radio package requires a set of signal processing tasks performed in a specific sequence such as channel estimation, equalization, and de-interleaving. Only after all of these tasks are finished will a radio package be demodulated successfully. If any one of the tasks in the sequence fails to be completed, the entire radio package will be lost.

In a multimode SDR terminal, different radio protocols are simultaneously supported on the same generic processing platform. In order to support simultaneous operation of different radio protocols at the same SDR terminal, a generic SDR processor must be able to interrupt a task and context switch between tasks. For example, during the processing of one radio package, if a radio package of another radio protocol arrives, the system should be able to schedule the later arriving radio package. In order to meet the time requirements of radio packages, it may be necessary to interrupt the current task processing and implement a context switch to process the later arriving radio package. Once the later arriving radio package is processed, another context switch can be made back to the original task. In order to resume processing a task, context information must be stored and reloaded back into the processing pipeline.

Most processing of incoming radio communications in SDR terminals involves pure arithmetic operations with regular memory accessing. Soft-pipeline technology has been widely used in SDR programming to optimize the execution of program instructions. Typically, the soft-pipeline needs considerable cycles to set up and drain the pipeline upon each context switch and the sudden pipeline flush that results from an interrupt usually leads to unrecoverable data loss of the task that is in process.

Implementing an interrupt in an SDR terminal typically involves storing and uploading context information such as temporary calculation results and parameters. This requires additional resources such as registers and memory. The context store and resume operations also take some time, which can negatively affect the real time performance of a SDR terminal. Additionally, a conventional context switch causes a pipeline flush, which may cause unrecoverable data loss.

In accordance with an embodiment of the invention, the processing of a radio package is divided into subtasks and results of the radio package processing are stored on a per-subtask basis. Because the processing of a radio package is divided into subtasks and because results of the processing are stored on a per-subtask basis, context switches can be made at the subtask level instead of at the task level. With the ability to perform context switches at the subtask level, the processing of radio packages can be scheduled in a more efficient manner and context switches can be made without losing processing results that have already been generated. In addition to storing the processing results on a per-subtask basis, in an embodiment, a processing pipeline is drained on a per-subtask basis.

In an embodiment in accordance with the invention, a method for processing radio packages in a multimode SDR terminal involves receiving a radio package, dividing processing of the radio package into subtasks, processing the radio package on a per-subtask basis, draining a processing pipeline on a per-subtask basis, and storing results from the processing on a per-subtask basis.

In another embodiment in accordance with the invention, a method for processing radio packages in a multimode SDR terminal involves receiving a radio package of a first radio protocol, dividing processing of the radio package of the first radio protocol into subtasks, receiving a radio package of a second radio protocol, wherein the first and second radio protocols are different, dividing processing of the radio package of the second radio protocol into subtasks, and performing a context switch between processing of the radio packages of the first and second radio protocols at a subtask level.

In another embodiment in accordance with the invention, a multimode SDR terminal includes a radio frequency (RF) module configured to receive a radio package and a microprocessor configured to divide processing of the radio package into a series of subtasks, process the radio package on a per-subtask basis, drain a processing pipeline on a per-subtask basis, and output results from the processing to a memory on a per-subtask basis.

Other aspects and advantages of the present invention will become apparent from the following detailed description, taken in conjunction with the accompanying drawings, illustrating by way of example the principles of the invention.

Throughout the description, similar reference numbers may be used to identify similar elements.

The basic processing unit of a radio communication is a discrete radio package. Depending on the radio protocol, a discrete radio package may be identified as, for example, a symbol, a frame, or a time slot. In general, every radio package has a maximum time in which the radio package must be processed before it becomes unusable for real-time wireless communications. In a real-time system, the maximum time translates to a deadline time. If the processing of a radio package cannot be finished before the deadline time, the radio package is deemed to have failed. If the processing of the radio package is completed before the deadline time, there are processing resources that may be freed up for other uses.

Figure 1:
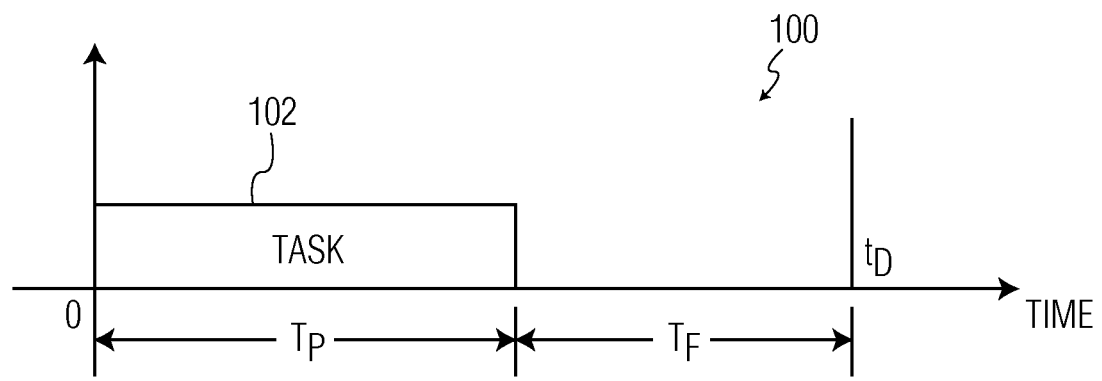
FIG. 1 illustrates a processing timeline associated with a radio package in an SDR terminal.

FIG. 1 illustrates a processing timeline 100 associated with a radio package in an SDR terminal. In the embodiment of FIG. 1, the radio package is processed as a single task 102 and the task must be completed by a deadline time, $t_D$. The processing time of the task is identified as, $T_P$. If the processing time, $T_P$, is less than the deadline time, $t_D$, then there is some free time, $T_F$, and if the processing time, $T_P$, is greater than the deadline time, $t_D$, then the radio package will fail and any processing completed on the task will be lost.

Figure 2:
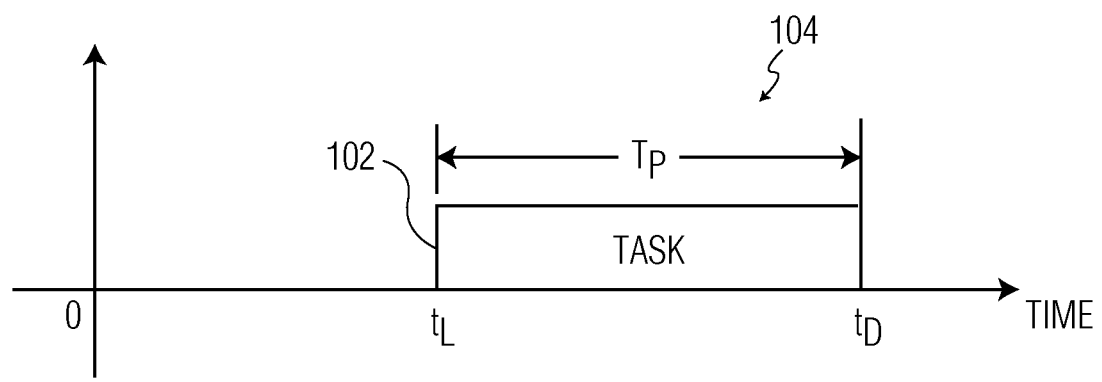
FIG. 2 illustrates the latest beginning time of the task from FIG. 1 given the processing time and the deadline time of the radio package from FIG. 1.

Although a radio package must be completely processed by the deadline time, the latest point in time at which a task can begin and still be successfully completed is a function of the deadline time and the processing time of the radio package. FIG. 2 is a processing timeline 104 that illustrates the latest beginning time, $t_L$, of the task 102 from FIG. 1 given the processing time, $T_P$, and the deadline time, $t_D$, from FIG. 1. In operation, the task can begin any time before the latest beginning time, $t_L$, and still be completed by the deadline time. Given the above-identified illustrations, the relationship between the deadline time, $t_D$, the processing time, $T_P$, the free time, $T_F$, and the latest beginning time, $t_L$, can be expressed as:

$$t_L = t_D - T_P + T_F \quad (1)$$

In a multimode SDR terminal, it is desirable to be able to support radio packages that are transmitted according to two different radio protocols. Further, it is desirable to be able to support the two different radio protocols simultaneously. In the case where two different radio protocols are supported simultaneously in the same multimode SDR terminal, it is possible that radio packages from the two different protocols will need to be processed during overlapping time intervals.

Figure 3:
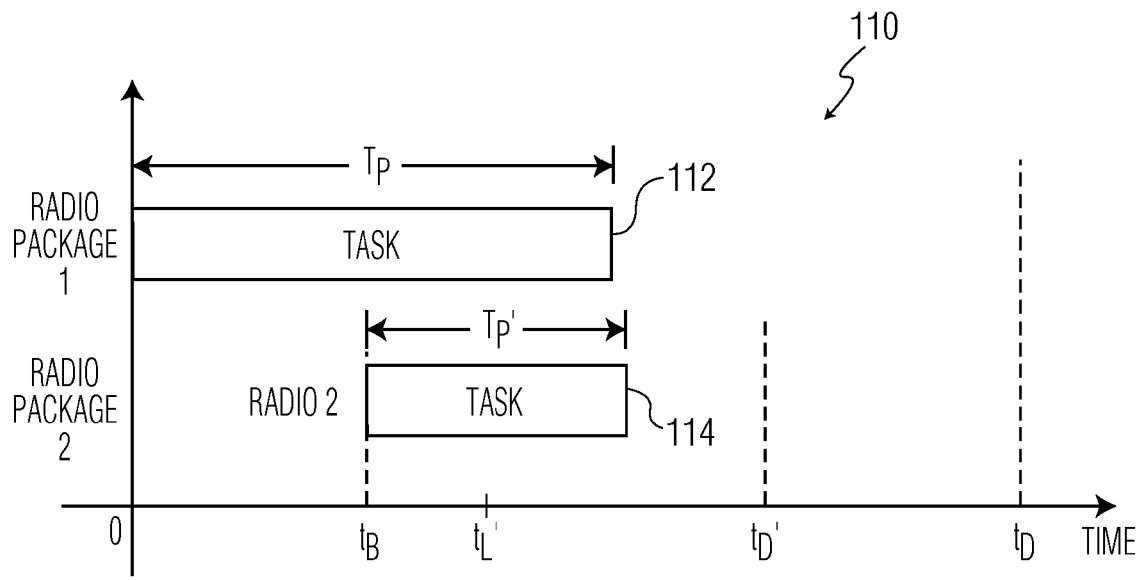
FIG. 3 illustrates a processing timeline of tasks related to two different radio packages of two different radio protocols that are processed within the same SDR terminal.

For example, FIG. 3 illustrates a processing timeline 110 of tasks 112 and 114 related to two different radio packages of two different radio protocols that are processed within the same SDR terminal. In the situation illustrated in FIG. 3, the processing of radio package 1 has a deadline time of $t_D$ and the processing of radio package 2 has a deadline time of $t_{D'}$. Further, the processing of radio package 1 began before radio package 2 was received, where the receipt time of radio package 2 is identified as $t_B$, the "burst time." In order for the processing of radio package 2 to be completed before its deadline time, $t_{D'}$, the processing of radio package 2 must begin by its latest beginning time, $t_{L'}$. Beginning the processing of radio package 2 by its latest beginning time, $t_{L'}$, would require the processing of radio package 1 to be interrupted. Interrupting the processing of radio package 1 would cause all of the processing results from the current task to be lost and may cause radio package 1 to fail depending on its deadline time $t_D$. On the other hand, if the task for radio package 2 is not begun by its latest beginning time, $t_{L'}$, radio package 2 will fail.

In accordance with an embodiment of the invention, the processing of a radio package is divided into subtasks and results of the processing are stored on a per-subtask basis. Because the processing of a radio package is divided into subtasks and because results of the processing are stored on a per-subtask basis, context switches can be made at the subtask level instead of at the task level. With the ability to perform context switches at the subtask level, the processing of radio packages can be scheduled in a more efficient manner and context switches can be made without losing processing results that have already been generated. In addition to storing processing results on a per-subtask basis, the processing pipeline associated with the radio package is drained on a per-subtask basis. Draining the processing pipeline on a per-subtask basis can avoid the need for additional registers and memory to store data in the pipeline during context switches so that the resource utilization and complexity of context switches can be reduced.

Figure 4:
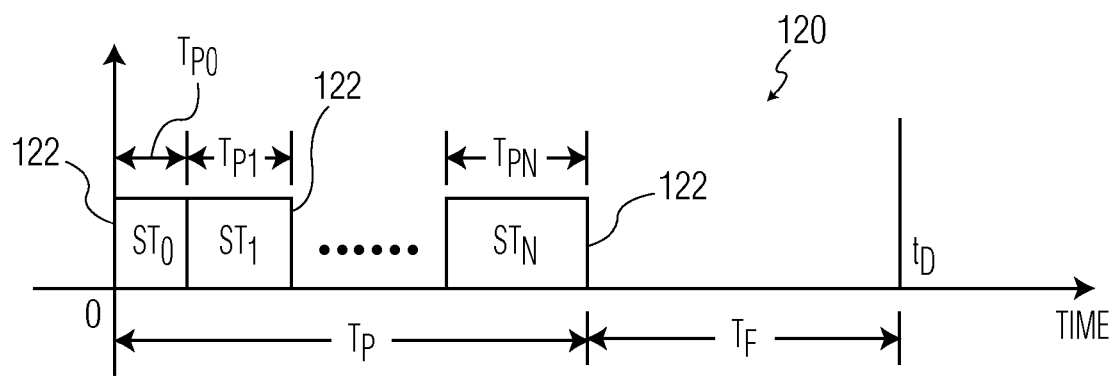
FIG. 4 illustrates a processing timeline associated with a radio package in which the processing of the radio package has been divided into subtasks.

FIG. 4 illustrates a processing timeline 120 associated with a single radio package in which the processing of the radio package has been divided into subtasks 122. In particular, processing of the single radio package is divided into subtasks $ST_0$-$ST_N$. The processing time associated with each subtask is identified as $T_{Pi}$ for i=0–N and the total processing time for an entire radio package can be expressed as:

$$T_P = \sum_{i=0}^{N} T_{Pi} \quad (2)$$

Upon completion of each subtask, results from the subtask processing are stored in a memory so that there is no additional content in the registers of the processor. With the results of the subtask processing stored in memory, it is not necessary to backup the register content during a subsequent context switch. Additionally, a processing pipeline is drained upon the completion of each subtask. Pipelining is used in processors to allow the parallel execution of two or more consecutive instructions from a nominally sequential stream so that high efficiency processing can be achieved. However, a sudden interruption of the pipeline may induce the loss of data. In an embodiment, draining the pipeline involves finishing all of the current processing tasks that are present in the pipeline.

As described above, processing radio packages of a certain radio protocol includes a series of repetitive steps which are the same for each incoming radio package of the respective radio protocol. Therefore, the particular rules for dividing the processing of a radio package into subtasks are typically the same for each radio package of a particular radio protocol. The division of subtasks can be pre-established and applied to radio packages upon receipt at the SDR terminal.

In an embodiment, rules for dividing the processing of radio packages into subtasks are stored in a subtask database that is maintained in the SDR terminal. For example, the subtask database has at least one radio protocol-specific subtask division rule for each radio protocol that is supported by the SDR terminal. Upon receipt of a radio package, the subtask database is accessed and searched according to the radio protocol of the radio package to find the appropriate radio protocol-specific subtask division rule. In an embodiment, the subtask database is accessed the first time a radio package of a new radio protocol is received and the corresponding subtask division rule is loaded into the SDR terminal's processor. Receipt of subsequent radio packages of the same protocol does not require accessing the subtask database.

Because the processing of radio packages is divided into subtasks, context switching can be accomplished at the subtask level instead of only at the task level. In an embodiment, context switching only occurs upon completion of a subtask. That is, a subtask is not interrupted so that a context switch can be performed. As is described below, subtask level context switching leads to better use of processing time and less lost data.

Figure 5:
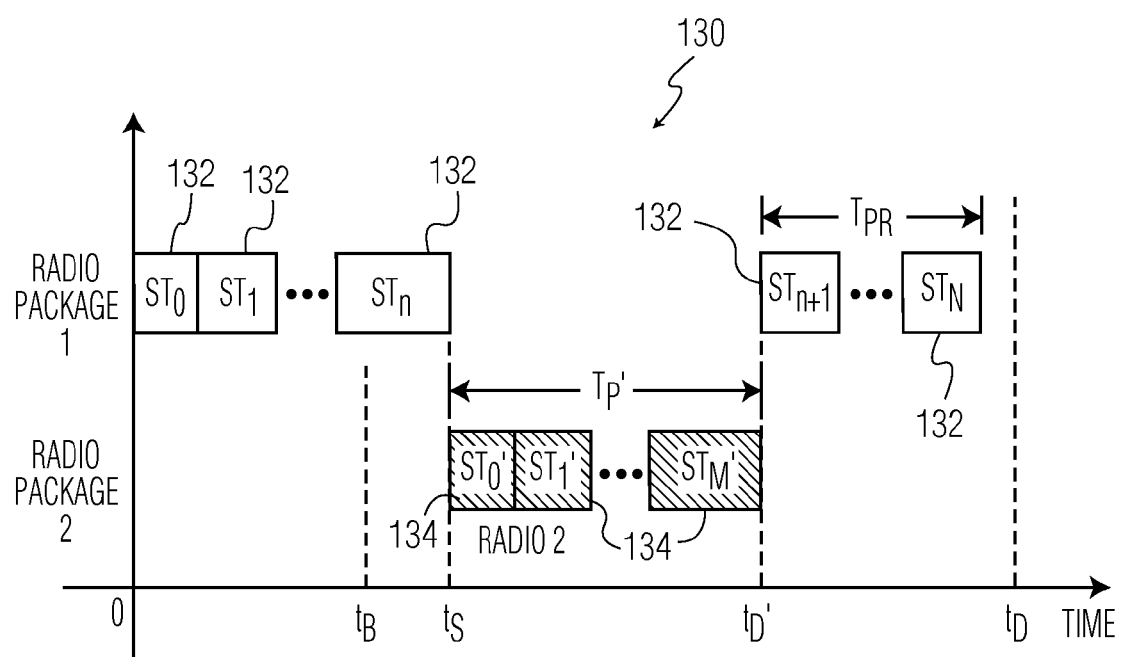
FIG. 5 illustrates a processing timeline associated with two radio packages of two different radio protocols that are scheduled at a subtask level.

FIG. 5 illustrates a processing timeline 130 associated with two radio packages of two different radio protocols that are processed on the same SDR terminal. In the example of FIG. 5, the radio packages are the same as the radio packages of FIG. 3 except that the processing of the radio packages is divided into subtasks 132 and 134 and the scheduling of the radio packages is done at the subtask level instead of at the task level. Referring to FIG. 5, the processing of radio package 1 is divided into N subtasks, $ST_0$-$ST_N$, and the processing of radio package 2 is divided into M subtasks, $ST_0$-$ST_{M'}$. Radio package 1 has a deadline time of $t_D$, radio package 2 has a deadline time of $t_{D'}$, and the processing of radio package 1 begins at time t=0. At time $t_B$, radio package 2 is received at the SDR terminal in a burst. The SDR terminal then must determine whether or not it is possible to process both radio packages to completion within the deadline time of the respective radio packages, $t_D$ and $t_{D'}$. Although it is not possible to meet the deadline time of radio package 2 if the processing of radio package 2 does not begin until the processing of radio package 1 is complete, it is possible to meet the deadline time of both radio packages 1 and 2 if the processing of radio package 1 is put on hold while radio package 2 is processed. In accordance with an embodiment of the invention, the processing of the radio packages is scheduled at the subtask level such that a first context switch takes place upon the completion of subtask $ST_n$ of radio package 1 and a second context switch takes place upon the completion of subtask $ST_{M'}$ of radio package 2. In particular, radio package 1 is processed until the completion of subtask $ST_n$, at which time a context switch occurs to radio package 2. After the context switch, all of the subtasks of radio package 2 are processed to completion. Upon completion of the last subtask of radio package 2, a context switch occurs back to radio package 1. Specifically, the processing of radio package 1 resumes at subtask $ST_{n+1}$ and the remaining subtasks of radio package 1 are then processed to completion. As illustrated in FIG. 5, subtask level context switching enables both radio protocols to be processed to completion before their respective deadline time. Additionally, because processing results are stored on a per-subtask basis, the context switching does not cause processing results to be lost.

An embodiment of subtask level scheduling in an SDR terminal is described below in conjunction with the example of FIG. 5. Referring to FIG. 5, subtask $ST_n$ is in progress when radio package 2 is received at the SDR terminal (time $t_B$). Additionally, the time of completion of the current task is identified as $t_S$ and the remaining time required to process the current radio package is $T_{PR}$. Given the example of FIG. 5, the time constraints of radio packages 1 and 2 are expressed as:

$$\text{Radio package 1: } t_D - t_S - T_{P'} > T_{PR}; \quad (3)$$

and $$\text{Radio package 2: } t_{D'} - t_S > T_{P'}; \quad (4)$$

where, $$T_{PR} = \sum_{i=n+1}^{N} T_{Pi}. \quad (5)$$

Before a context switch can be made from radio package 1 to radio package 2, the conditions of both equations (3) and (4) should be met. In the example of FIG. 5, at the time radio package 2 is received, the conditions of both equations are met and therefore a context switch is made from radio package 1 to radio package 2. If the conditions of both equations could not be met, the processing of radio package 1 could be continued uninterrupted.

Figure 6:
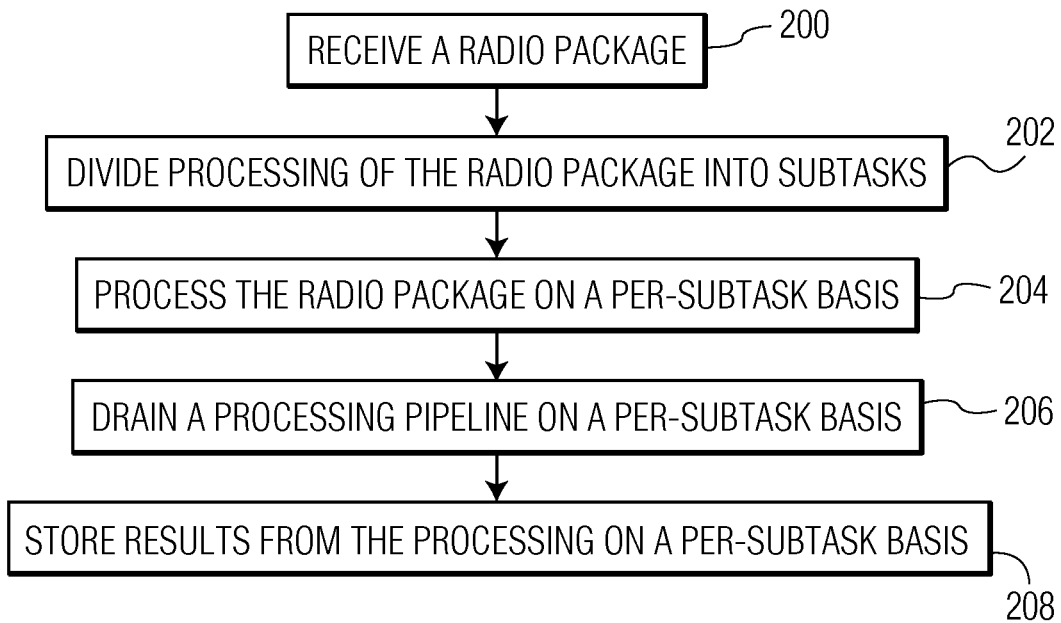
FIG. 6 is a process flow diagram of a method for processing radio packages in a multimode SDR terminal in accordance with an embodiment of the invention.

FIG. 6 is a process flow diagram of a method for processing radio packages in a multimode SDR terminal in accordance with an embodiment of the invention. At block 200, a radio package is received. At block 202, processing of the radio package is divided into subtasks. At block 204, the radio package is processed on a per-subtask basis. At block 206, a processing pipeline is drained on a per-subtask basis. At block 208, results from the processing are stored on a per-subtask basis.

Figure 7:
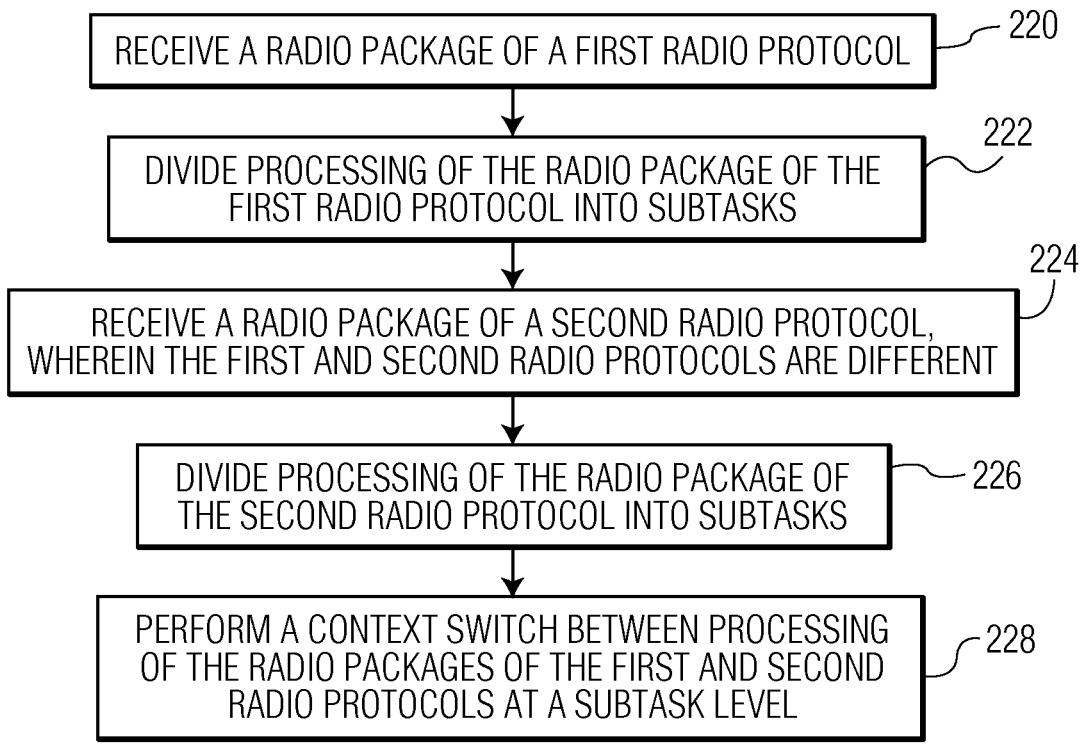
FIG. 7 is a process flow diagram of another method for processing radio packages in a multimode SDR terminal in accordance with an embodiment of the invention.

FIG. 7 is a process flow diagram of another method for processing radio packages in a multimode SDR terminal in accordance with an embodiment of the invention. At block 220, a radio package of a first radio protocol is received. At block 222, processing of the radio package of the first radio protocol is divided into subtasks. At block 224, a radio package of a second radio protocol is received, wherein the first and second radio protocols are different. At block 226, processing of the radio package of the second radio protocol is divided into subtasks. At block 228, a context switch is performed at a subtask level between processing of the radio packages of the first and second radio protocols.

Figure 8:
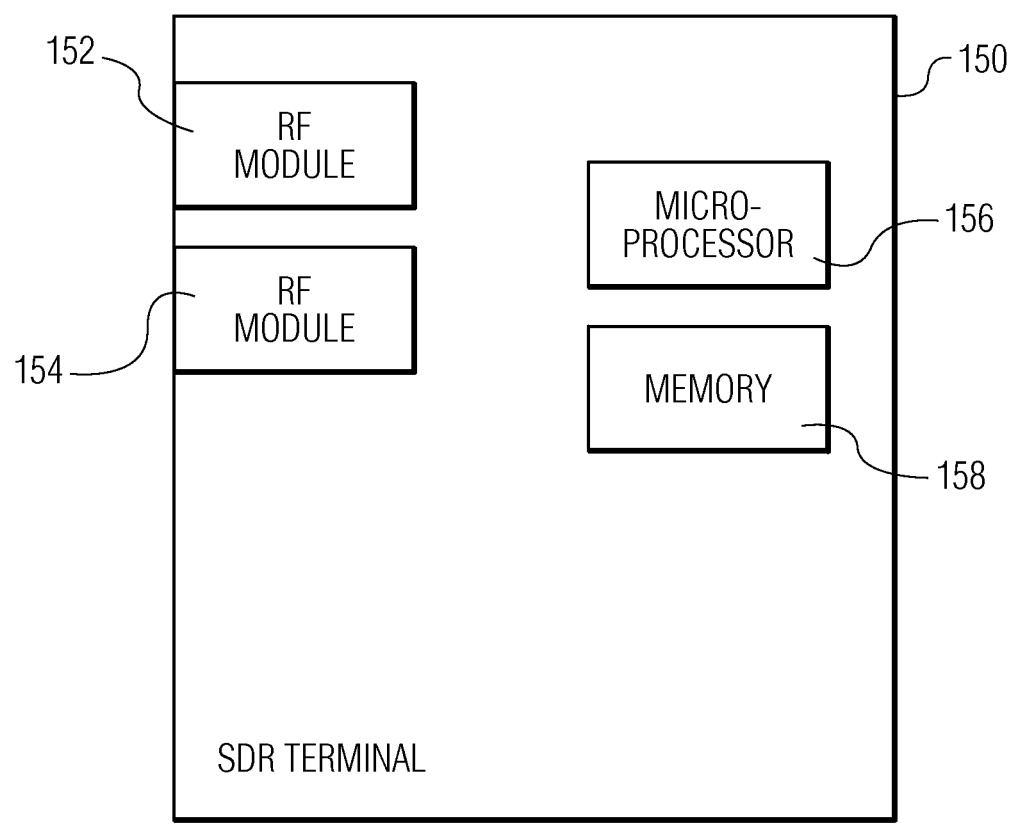
FIG. 8 depicts an embodiment of a multimode SDR terminal that includes two RF modules, a microprocessor, and memory.

The above-described techniques for processing radio packages are implemented in a multimode SDR terminal. FIG. 8 depicts an embodiment of a multimode SDR terminal 150 that includes two RF modules 152 and 154, a microprocessor 156, and memory 158. The RF modules include components for transmitting and receiving radio packages using RF signals. Components of the RF modules may include, for example, antennas, mixers, filters, oscillators, analog-to-digital converters, and digital-to-analog converters. The microprocessor is a processor that is able to execute software instructions to implement various baseband processing operations such as channel estimation, equalization, and de-interleaving. Various types of microprocessors are known in the field of SDR. The memory can include, for example, random access memory (RAM) and/or Flash memory as is known in the field. In an embodiment, the SDR terminal stores software code that when executed by the microprocessor performs the functions described above with reference to FIGS. 3 and 5-7. Additionally, the subtask database may be stored in the memory of the SDR terminal. Although FIG. 8 depicts a multimode SDR terminal with dual RF modules, the above-described techniques are also applicable to a multimode SDR terminal that has a single RF module but still processes radio packages of different protocols in parallel.

The above-described techniques for processing radio packages in a multimode SDR terminal are applicable to SDR terminals that are compatible with various different wireless communications protocols. For example, the above-described techniques can be applied to wireless protocols that include 2G, 3G/B3G cellular systems, WLAN series, WiMax, BLUETOOTH, ZigBee, Digital TV, and GPS.

Although specific embodiments of the invention have been described and illustrated, the invention is not to be limited to the specific forms or arrangements of parts as described and illustrated herein. The invention is limited only by the claims.

What is claimed is:

1. A method for processing radio packages in a multimode software defined radio (SDR) terminal, the method comprising:
   receiving a radio package of a first radio protocol;
   dividing processing of the radio package of the first radio protocol into a first set of subtasks, wherein the first set of subtasks comprise channel estimation, equalization, and de-interleaving;
   receiving a radio package of a second radio protocol, wherein the first and second radio protocols are different;
   dividing processing of the radio package of the second radio protocol into a second set of subtasks, wherein the second set of subtasks comprise channel estimation, equalization, and de-interleaving;
   performing a context switch between processing of the radio packages of the first and second radio protocols at a subtask level, wherein performing a context switch at the subtask level comprises:
      performing a first subtask of the first set of subtasks to process the radio package of the first radio protocol;
      before performing all of the first set of subtasks to process the radio package of the first radio protocol, switching to a second subtask of the second set of subtasks to process the radio package of the second radio protocol upon completion of the first subtask to process the radio package of the first radio protocol;
      performing all of the second set of subtasks to process the radio package of the second radio protocol;
      switching back to the first set of subtasks to process the radio package of the first radio protocol upon completion of all of the second set of subtasks to process the radio package of the second radio protocol; and
      storing results of the first and second set of subtasks upon completion of the first and second set of subtasks; and
   draining a processing pipeline upon performance of each of the subtasks of channel estimation, equalization, and de-interleaving by finishing all of the current processing elements that are present in the processing pipeline on a per-subtask basis.

2. The method of claim 1 wherein dividing processing of the radio packages into subtasks comprises searching a subtask database according to a radio protocol of each radio package.

3. A multimode software defined radio (SDR) terminal comprising:
   a radio frequency module configured to receive a radio package;
   a microprocessor configured to:
      divide processing of the radio package into a series of subtasks, wherein the subtasks in the series are subsets of the same task;
      process the radio package on a per-subtask basis;
      drain a processing pipeline on a per-subtask basis; and
      output results from the processing to a memory on a per-subtask basis;
   wherein the microprocessor is further configured to:
      receive a radio package of a first radio protocol;
      divide processing of the radio package of the first radio protocol into a first set of subtasks, wherein the first set of subtasks comprise channel estimation, equalization, and de-interleaving;
      receive a radio package of a second radio protocol, wherein the first and second radio protocols are different;
      divide processing of the radio package of the second radio protocol into a second set of subtasks, wherein the second set of subtasks comprise channel estimation, equalization, and de-interleaving; and
      perform a context switch between processing of the radio packages of the first and second radio protocols at a subtask level, wherein performing a context switch at the subtask level comprises:
      performing a first subtask of the first set of subtasks to process the radio package of the first radio protocol;
      before performing all of the first set of subtasks to process the radio package of the first radio protocol, switching to a second subtask of the second set of subtasks to process the radio package of the second radio protocol upon completion of the first subtask to process the radio package of the first radio protocol;
      performing all of the second set of subtasks to process the radio package of the second radio protocol;
      switching back to the first set of subtasks to process the radio package of the first radio protocol upon completion of all the second set of subtasks to process the radio package of the second radio protocol; and
      drain the processing pipeline upon completion of each of the subtasks of channel estimation, equalization, and de-interleaving by finishing all of the current processing elements that are present in the processing pipeline on a per-subtask basis.

4. The multimode SDR terminal of claim 3 further comprising a subtask database that stores radio protocol-specific subtask division rules.

5. The multimode SDR terminal of claim 4 wherein the microprocessor is configured to search the subtask database according to a radio protocol of the radio package.

6. The multimode SDR terminal of claim 3 wherein the microprocessor is configured to output results to the memory upon completion of each subtask.

* * * * *